United States Patent [19]

Suchko

[11] 3,970,915
[45] July 20, 1976

[54] FAULT DETECTOR AND INTERRUPT CIRCUIT USEFUL IN A TELEVISION SIGNAL PROCESSING SYSTEM

[75] Inventor: Adam John Suchko, Elizabeth, Pa.
[73] Assignee: RCA Corporation, New York, N.Y.
[22] Filed: Dec. 30, 1974
[21] Appl. No.: 537,548

[52] U.S. Cl.................................. 321/21; 321/47; 315/127
[51] Int. Cl.² .................... H02M 1/08; H02M 7/00
[58] Field of Search.................. 315/401, 411, 127; 328/259, 267, 8, 11, 12; 321/11, 21, 47, 48, 49, 50; 317/DIG. 5, 16

[56] References Cited
UNITED STATES PATENTS

| | | | |
|---|---|---|---|
| 2,619,525 | 11/1952 | Webb................................. | 328/259 |
| 3,419,807 | 12/1968 | Hursh et al. ....................... | 328/259 |
| 3,783,335 | 1/1974 | Gries................................. | 315/411 |

Primary Examiner—Maynard R. Wilbur
Assistant Examiner—T. M. Blum
Attorney, Agent, or Firm—E. M. Whitacre; P. M. Emanuel

[57] ABSTRACT

A supply voltage for signal processing circuits of a television signal processing system is developed in the secondary circuit of a transformer. AC power is coupled to the primary of the transformer through a circuit breaker whose operation is controlled in response to the supply voltage. The circuit breaker includes a normally nonconductive (i.e., high impedance) path which is rendered conductive (i.e., low impedance) with the development of the appropriate supply voltage and rendered nonconductive when the supply voltage falls below a predetermined threshold. A normally conductive (i.e., low impedance) path is coupled across the normally nonconductive path and is rendered nonconductive (i.e., high impedance) as current flows through it. The circuit breaker is particularly useful when the transformer is of the ferroresonant type, since the primary current of a ferroresonant transformer remains substantially constant with changes in the secondary current even under fault conditions.

In an illustrative embodiment the circuit breaker includes a second normally nonconductive path whose conduction is also controlled in response to development of the supply voltage. One portion of the signal processing system is coupled to the supply voltage through the second normally nonconductive path, while another portion is directly coupled to the supply voltage to inhibit lockup conditions arising from the interaction of these portions.

11 Claims, 1 Drawing Figure

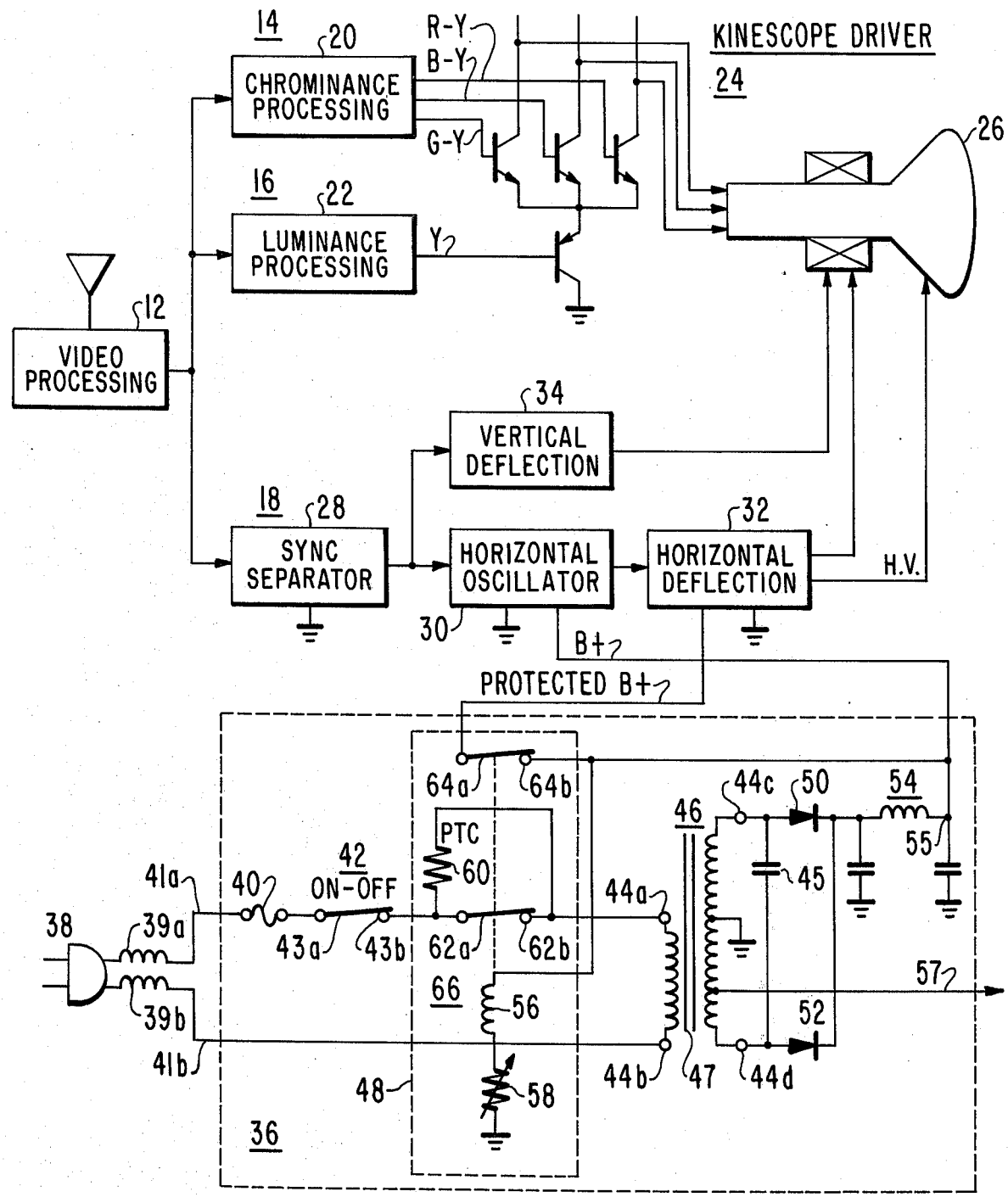

FAULT DETECTOR AND INTERRUPT CIRCUIT USEFUL IN A TELEVISION SIGNAL PROCESSING SYSTEM

This application relates to apparatus for protecting power supply circuitry and particularly relates to apparatus for protecting power supply circuitry used in television signal processing apparatus.

Protection devices are well known for inhibiting the operation of a power supply when a fault condition in a signal processing circuit to which it normally supplies power causes an excessive amount of current to be drawn from the power supply. Such prior protection devices include fuses and circuit breakers or like devices which operate to disconnect either the input or output of a power supply circuit when current in excess of a predetermined current flows through the protection device or other part of the circuit. Circuit breakers may be formed, for example, by thermosensitive devices, such as a bimetallic strip, or electronic devices, such as silicon controlled rectifiers (SCR's). In selecting a protection device for a particular application, consideration should be given to such factors as the nature of faults which may occur and how these faults are manifested.

Recent developments in the field of power supplies involve devices which have exceptional regulating properties. Such a device is the ferroresonant transformer, sometimes called a voltage regulated transformer (VRT), which has the characteristic that a voltage developed at its secondary remains essentially constant once the voltage applied to its primary reaches a threshold value. The regulation characteristic of the ferroresonant transformer depends primarily on its core material and geometric factors such as the number of turns. Because of this characteristic, ferroresonant transformers have found application in television signal processing apparatus such as television receivers. For this application, for example, 60 Hz ferroresonant transformers may be utilized which provide satisfactory voltage regulation at their secondaries with variations in the alternating input line voltage over a range of from 70 to 140 volts. The utilization of one type of ferroresonant transformer in a television receiver is described, for example, in U.S. Pat. No. 3,798,477, entitled "Solid State Television Receiver with Magnetically Regulated Power Supply," issued to Hans E. Manske on Mar. 9, 1974.

A disadvantage of a ferroresonant transformer is that, even with its secondary shorted, the current in the primary increases only slightly from the normal input current. This makes the utilization of conventional circuit breakers, fuses or similar protection devices in the primary circuit of a ferroresonant transformer undesirable since conventional protection devices only effectively disconnect a power supply when the current flowing through the protection device during a fault condition considerably exceeds (i.e., is approximately twice) the current normally flowing through the protection device. Furthermore, conventional protection devices may require a relatively long time to operate depending on the current flowing through them.

Although a protection device may be utilized in the secondary circuit of the ferroresonant transformer, such arrangements have not been found to effectively protect signal processing circuits coupled to the secondary circuit through the protection devices since the components of the signal processing circuit may be overstressed before sufficient current is drawn to operate the protection device. If the device is selected to be operated in response to lower currents, the device may be undesirably operated in response to temporary high load conditions which in general are not harmful and may be tolerated. As a result, operation of the signal processing unit is interrupted until the protection device is reset, often by manual operation. Manual resetting is undesirable in the context of a television receiver since the reset mechanism is often located in a relatively inaccessible portion of the receiver and is therefore inconvenient to the viewer.

Thus, there is a requirement for a protection circuit which may be used with a ferroresonant transformer or like device which will effectively operate before circuit components are harmfully overstressed, but which is self-resetting after the occurrence of a temporary high load condition.

Consideration should also be given in the selection of a protection device to temporary faults which may arise due to the interaction of various portions of the signal processing circuit to which a main power supply is coupled. For instance, in a television receiver, a problem may arise where a horizontal oscillator, arranged to drive a horizontal deflection output circuit, is coupled to a low voltage operating supply which, in turn, is derived from a high voltage supply coupled to the aforementioned deflection output circuit. Excessively high currents drawn by the horizontal deflection circuit may cause the high voltage and then, in turn, the low voltage derived from the high voltage, to decrease. Because of this loading, the low voltage for the horizontal oscillator may fall below the minimum supply voltage required for correct operation (i.e., correct frequency) of the horizontal oscillator, thereby causing the horizontal deflection circuit to continue drawing excessively high currents. As a result of this interaction between the horizontal oscillator and the horizontal deflection circuit, a so-called "lockup" situation may arise, causing a temporary fault condition unless there are provisions for inhibiting the interaction. A lockup condition which may arise due to the interaction of a horizontal oscillator and a horizontal deflection circuit of the type utilizing silicon controlled rectifier (SCR) devices as trace and commutating switches and apparatus to inhibit such a lockup condition is described in a copending patent application Ser. No. 496,224, filed Aug. 9, 1974, entitled "Hysteresis Voltage Supply for Deflection Synchronizing Waveform Generator," by Steven Alan Steckler and assigned to the same assignee as the present invention.

In order to inhibit lockup conditions, it may be desirable for a circuit breaker to disconnect power from one portion of a signal processing system such as the horizontal deflection circuit of a television receiver, while continuing to provide power to another portion, such as the horizontal oscillator.

In accordance with the present invention, a source of input power is coupled to means for developing a desired supply voltage for signal processing circuits of a television receiver or the like through a circuit breaker whose operation is controlled in response to the supply voltage. The circuit breaker includes a normally nonconductive (high impedance) path which is rendered conductive (low impedance) in response to the development of the desired supply voltage and rendered nonconductive when the supply voltage falls below a predetermined threshold. A normally conductive (low impedance) path is coupled across the normally nonconductive path and is rendered substantially nonconductive (high impedance) in response to current flow through it. The circuit breaker is desirably utilized where the transformer is of the ferroresonant type.

In accordance with another feature of the present invention, the supply voltage is coupled to a first portion of the signal processing circuit through a second normally nonconductive path whose conduction is also controlled in response to the supply voltage while the supply voltage is directly coupled to a second portion of the receiver which controls the operation of the first portion to inhibit a lockup condition arising because of the interaction of the first and second portions.

The present invention may best be understood by reference to the following description and accompanying sole FIGURE of the drawing which is a schematic of an embodiment of the present invention in a television signal processing apparatus.

In the FIGURE, the general arrangement of a color television receiver employing the present invention includes a signal processing unit 12 responsive to radio frequency (RF) television signals for generating by means of suitable intermediate frequency (IF) circuits (not shown) and detection circuits (not shown) a composite video signal comprising chrominance, luminance, synchronizing and sound signal portions. Outputs of signal processing unit 12 are coupled to a chrominance channel 14, a luminance channel 16, a channel 18 for processing synchronizing signals and a channel (not shown) for processing sound signals. Chrominance channel 14 includes a chrominance processing unit 20 which serves to derive color signals, e.g., R–Y, B–Y and G–Y color difference signals, from the chrominance portion of the composite video signal.

Luminance channel 16 includes a signal processing unit 22 which serves to amplify and otherwise process luminance signal portions of the composite video signal to produce an output signal, Y.

The color difference signals are coupled to a kinescope driver circuit 24, where they are matrixed with the output signal, Y, of luminance channel 16 to produce color signals, e.g., R, B and G signals, which are coupled to kinescope 26.

Channel 18 includes a synchronization signal separator (sync separator) 28 which serves to separate horizontal and vertical synchronization pulses from the composite video signal. The synchronization pulses are coupled to a horizontal oscillator 30 which serves to generate timing pulses. These timing pulses are coupled to a horizontal deflection unit 32 where they are utilized to generate a sweep or sawtooth waveform to control the horizontal deflection of the electron beam generated by kinescope 26. A horizontal deflection circuit suitable for use in the television receiver of the FIGURE is described in U.S. Pat. No. 3,452,244, entitled "Electron Beam Deflection and High Voltage Generation Circuit," issued to W. F. W. Dietz on June 24, 1969, and assigned to the same assignee as the present invention. The horizontal deflection circuit described in the Dietz patent is of the type utilizing silicon controlled rectifier (SCR) devices as trace and commutating switches.

Horizontal deflection circuit 32 also serves to generate high voltages required to operate kinescope 26.

Synchronizing pulses are also coupled from sync separator 28 to a vertical deflection circuit 34 which serves to derive a sweep or sawtooth signal to control the vertical deflection of the electron beam generated by kinescope 26.

The general arrangement of a television receiver of the type thus far described is shown in detail in RCA Color Television Service Data, 1973 No. C-8 (a CTC-68 type receiver), published by RCA Corporation, Indianapolis, Ind.

The power supply portion of the receiver is generally indicated as block 36 enclosed by a dashed line. Line power (e.g., 115 volts AC at 60 Hz) is coupled through a line cord, the plug of which is indicated as 38, to power supply 36 through an inductor 39a in high line side 41a and an inductor 39b in low line side or neutral line 41b. Inductors 39a and 39b serve to filter high frequency noise signals from the 60 Hz input signal. High line side 41a is coupled to switch arm 43a of a single-pole, single-throw on-off switch 42 shown in the closed position, through a fuse 40 or like device, such as a current responsive circuit breaker, which becomes an open circuit when current in excess of a predetermined current value flows through it.

Contact 43b of one-off switch 42 is coupled to a terminal 44a of the primary of a transformer 46 via a circuit breaker device 48. Low line side 41b is directly coupled to terminal 44b of the primary of transformer 46. Although transformer 46 may comprise any suitable transformer conventionally utilized in power supply circuits, it is desirable that transformer 46 be a ferroresonant transformer in light of the self-regulating characteristic previously described. If transformer 46 is of the ferroresonant type, a suitable capacitor 45 should be coupled across the secondary (or a portion thereof) to resonate with the secondary at 60 Hz so that core 47 is saturated and transformer 46 operates in its regulating region.

Terminals 44c and 44d of the secondary of transformer 46 are respectively coupled to diodes 50 and 52 which are arranged with respect to a grounded center tap of transformer 46 to form a full-wave rectifying circuit. The full-wave rectified voltage is coupled to a filter 54 comprising, for example, a $\pi$-configuration LC network which serves to filter AC components from the full-wave rectified voltage to produce a DC supply voltage (e.g., 170 volts DC) at terminal 55.

The DC supply voltage developed at terminal 55, sometimes called B+, is directly coupled to horizontal oscillator 30 and indirectly coupled through a switch arm 64a and contact 64b of circuit breaker 48 to horizontal deflection circuit 32. This arrangement inhibits occurrence of the lockup condition which may occur due to the interaction of horizontal oscillator 30 and horizontal deflection circuit 32 previously described. The B+ voltage coupled to horizontal deflection circuit 32 through circuit breaker 48 will hereinafter be called PROTECTED B+. The B+ voltage provided at terminal 55 is also directly coupled to coil 56 of circuit breaker 48 to control its operation, as will be explained below.

It should be appreciated that portions of the secondary of transformer 46 may be coupled (as indicated by conductor 57) to additional circuits (not shown) for developing power for various other portions of the receiver. Furthermore, additional secondaries (not shown) may be provided on core 47 for similar reasons.

Circuit breaker 48 includes a double-pole, single-throw relay 66 (shown in its energized state) comprising a first switch arm (62a) and contact (62b) pair, a second switch arm (64a) and contact (64b) pair and coil 56 to close the switch arms 62a and 64a in response to a predetermined voltage applied to it. The series circuit comprising coil 56 and a variable resistor 58 is coupled between terminal 55 (B+) and ground (the B+ return). Relay 66 is in its energized state when the voltage developed at terminal 55 exceeds a predetermined threshold voltage. The value of the threshold voltage to energize relay 66 may be controlled by adjusting the value of resistor 58.

A thermistor 60 is coupled between switch arm 62a and contact 62b. Thermistor 60 has a positive temperature coefficient, i.e., the resistance of thermistor 60 changes as a direct function of temperature. As current flows through thermistor 60, it is self-heated and its impedance increases to a relatively high value such that only an insignificantly small current will flow through it after a short interval. A PTC thermistor found suitable for use in circuit breaker 48 is Texas Instruments Corporation Model Number 3GT2-4.

In operation, when on-off switch 42 is in the "on" position, i.e., closed, current flows through cold (low impedance) PTC thermistor 60 to the primary of transformer 46. Rectifiers 50,52 and filter 54 respond to the voltage across the secondary of transformer 46. As a result, B+ is developed at terminal 55, relay 66 is energized and arms 62a and 64a are urged to the closed position. Once switch 62a is in the closed position, thermistor 60 begins to cool, since it is bypassed and substantially all of the current in the primary circuit flows through switch arm 62a. In addition, B+ is directly coupled to horizontal oscillator 30 and indirectly to horizontal deflection circuit 32 through closed switch arm 64a.

When on-off switch 42 is again placed in the "off" position, power is removed from the primary of transformer 46. Relay 66 is de-energized when B+ at terminal 55 falls below a voltage sufficient to energized coil 56, opening switches 62a and 64a and thereby placing PTC thermistor 60 across open switch arm 62a and contact 62b.

Circuit breaker 48 is operative to prevent damage to the power supply circuit 36 and circuits supplied by power supply 36 during a variety of fault conditions. For instance, if there has been a component failure in a circuit portion directly coupled to the secondary of transformer 46, such as, for example, a shorted component in horizontal oscillator 30, causing an excessive amount of current to be drawn from the secondary of transformer 46, the voltage at terminal 55 decreases substantially. As a result, relay 66 is de-energized causing switch arms 62a and 64a to move to their open positions in a relatively short interval (typically less than 500 milliseconds) depending on the time constant of power supply circuit 36. Cold thermistor 60 (a low impedance) conducts all the primary current and rapidly becomes substantially nonconducting (high impedance) since its temperature and hence its impedance are directly related to the current flowing through it. Since switch arm 62a is opened and the impedance of thermistor 60 is high, no power is supplied to the primary of transformer 46 and the B+ supply is inactivated, preventing further stress to components of power supply 36 and circuits supplied by power supply 36. In order for the B+ supply to be continuously activated again the faulty component causing the fault condition must be replaced, since if on-off switch 42 is merely opened for a period and then closed, the above-described series of events will reoccur.

It should be noted that if transformer 46 is of the ferroresonant type, a faulty component coupled to the secondary of transformer 46 or other fault condition causing large currents to be drawn from the secondary will not, in general, cause fuse 40 to open since the current in the primary circuit of transformer 46 remains substantially constant with changes of current in the secondary. Fuse 40 merely serves to disconnect power from the primary when a fault in the primary circuit, such as a shorted primary turn, causes excessively large currents in the primary circuit. Thus it is clear that the arrangement of circuit breaker 48 is advantageous over conventional current responsive circuit breakers when utilized in a power supply employing a ferroresonant transformer.

If there is a component failure in circuits coupled to the PROTECTED B+ line, causing the B+ voltage at terminal 55 to decrease, the same sequence of events described above for a faulty component causing excessive current to be drawn from the B+ line occurs, except that the sequence of events is automatically recycled (typically two or three times). This recycling recurs because the source of the fault coupled to the PROTECTED B+ line is alternately disconnected from terminal 55 when relay 66 is de-energized in response to a decrease of the B+ voltage and reconnected to terminal 55 when relay 66 is energized in response to the development of B+ due to the application of current to the primary of transformer 46 through thermistor 60.

If B+ momentarily drops due to such causes as high voltage arcing or similar conditions, relay 66 is momentarily de-energized and then re-energized because of the path provided by cold thermistor 60. Thus, the operation of the receiver is not permanently interrupted because of momentary faults, thereby avoiding the necessity of manually resetting the circuit breaker.

Circuit breaker 48 is also operative to inhibit formation of a lockup condition due to the interaction of horizontal oscillator 30 and horizontal deflection circuit 32. Such a lockup condition may arise, as previously mentioned, where horizontal deflection circuit 32 is of the type wherein SCR devices are utilized as trace and commutating switches. Such horizontal deflection circuits tend to draw excessive amounts of current from the B+ supply if the oscillator circuit (such as horizontal oscillator 30) by which it is synchronized is not operating at the correct frequency. Generally, oscillators require a supply voltage above a predetermined threshold before they will operate at the correct frequency. The frequency of the horizontal oscillator may also be incorrect when the channel is changed. Thus, before the B+ supply voltage has risen to its full value, horizontal oscillator 30 may cause horizontal deflection circuit 32 to draw excessive amounts of current from the B+ supply. This, in turn, may prevent the B+ supply from achieving the voltage required by horizontal oscillator 30 in order to oscillate at the correct frequency resulting in a lockup condition.

If excessively large amounts of current are drawn by horizontal deflection circuit 32 due to the generation of an incorrect frequency by horizontal oscillator 30, the B+ voltage decreases and switch arm 64a opens, disconnecting horizontal deflection circuit 32 from the output of filter 54. Switch arm 62a also opens. However, power is coupled to the primary of transformer 46 through cold PTC thermistor 60 and B+ is developed at the output of filter 54, thereby applying supply voltage to horizontal oscillator 30. At the same time, switch arms 62a and 64a are closed due to the development of B+ at the output of filter 54. If at this time the frequency of horizontal oscillator 30 is correct, horizontal deflection circuit 32 will no longer draw excessive amounts of current from the power supply and normal operation continues. If one such sequence is not sufficient to correct the frequency of horizontal oscillator 30 and end the lockup condition, circuit breaker 48 will recycle the sequence until proper operation is achieved. It should be noted that if thermistor 60 becomes too hot during these additional cycles, power will be permanently disconnected from the primary of transformer 46 until circuit breaker 48 is reset by placing on-off switch 42 in the "off" position for a period long enough for thermistor 60 to cool off (typically 2 minutes) and then placing switch 42 in the "on" position.

Although circuit breaker 48 has been described in terms of mechanical type of relay, it should be appreciated that an electronic type of relay including a semiconductor device such as an SCR could be utilized. In addition, PTC thermistor 60 may be replaced by a suitable normally conducting device which is rendered nonconducting in response to current flowing through it. Furthermore, other means of varying the threshold voltage for the relay than variable resistor 58 may be utilized. These and other modifications to the circuit are intended to be included within the scope of the present invention.

In a test circuit comprising a 90 ohm load (simulating the DC impedance of ferroresonant transformer 46) coupled to an AC voltage source supplying 135 volts rms through a PTC thermistor of the 3GT2-4 type, it was found that the voltage developed across the load remained at approximately 105 volts rms for approximately 1.5 seconds from the application of power. The load voltage then rapidly decreased to a negligible value at a 65°C ambient temperature. It was determined that during the 1.5 second period the resistance of the thermistor was approximately 19 ohms and thereafter was above 1 megohm. It was also determined that the thermistor, without a heat sink, returned to its low resistance value, i.e., 19 ohms (low temperature condition), approximately 2 minutes after power was disconnected from the test circuit.

What is claimed is:

1. Apparatus for supplying operating voltage to signal processing circuits comprising:
   first and second circuit points;
   means for coupling said first circuit point to a source of alternating voltage;
   direct voltage supplying means coupled to said second circuit point for producing from said alternating voltage a direct operating voltage normally at least equal to a predetermined level; and
   switching means for coupling said means for coupling to a source of alternating voltage to said direct voltage supplying means, said switching means including a first circuit path coupled between said first circuit point and said second circuit point and controllable between high and low impedance states, sensing means coupled to said direct voltage supplying means and responsive to the level of said direct operating voltage for varying said first circuit path between said high and low impedance states when said operating voltage is below and at least equal to said predetermined level, respectively, and a second circuit path coupled between said first circuit point and said second circuit point in parallel relationship to said first circuit path and variable between low and high impedance states in direct relation to current flow therein.

2. The apparatus recited in claim 1 wherein said direct voltage supplying means includes a transformer having a primary coupled to said switching means and a secondary coupled to a rectifying means for developing said direct operating voltage.

3. The apparatus recited in claim 2 wherein said transformer is of the ferroresonant type.

4. The apparatus recited in claim 1 wherein said switching means includes a relay having a normally opened switch arm and a coil to close said switch arm coupled to said direct operating voltage.

5. The apparatus recited in claim 4 wherein said switching means includes means coupled between said coil and said direct operating voltage for adjusting the level of said direct operating voltage at which said coil will close said switch arm.

6. The apparatus recited in claim 4 wherein said second circuit path includes a positive temperature coefficient thermistor.

7. The apparatus recited in claim 1 wherein said switching means includes a third circuit path coupled between said supply voltage and a preselected portion of said signal processing circuits, said third circuit path being controllable between high and low impedance states in response to the level of said direct operating voltage, said third circuit path varying between said high and low impedance states when said operating voltage is below and at least equal to said predetermined level, respectively.

8. The apparatus recited in claim 7 wherein said preselected portion of said signal processing circuits includes a horizontal deflection means coupled to said direct operating voltage through said third circuit path and wherein horizontal oscillator means for synchronizing said horizontal deflection means are directly coupled to said direct operating voltage.

9. The apparatus recited in claim 8 wherein said horizontal deflection means is of the type including silicon controlled rectifying devices.

10. Apparatus comprising:
    means for processing television video signals including horizontal deflection means and horizontal oscillator means for synchronizing said horizontal deflection means;
    a source of AC input power;
    a ferroresonant transformer having a primary and a secondary;
    a relay having a first normally open switch arm and a coil to close said first switch arm, said source being coupled to said primary through said first switch arm;
    rectifying means coupled to said secondary for developing a DC supply voltage, said rectifying means being coupled to said coil, said first switch arm being closed when said DC supply voltage is at least equal to a predetermined level, said rectifying means being coupled to said horizontal oscillator means and said horizontal deflection means; and
    a positive temperature coefficient thermistor coupled across said first switch arm between said source and said primary.

11. The apparatus recited in claim 10 wherein said relay includes a second normally opened switch arm coupled between said rectifying means and said horizontal deflection means, the operation of said normally opened switch arm being controlled by said coil; and wherein said horizontal oscillator is directly coupled to said rectifying means.

* * * * *